(12) United States Patent
Tuteja et al.

(10) Patent No.: US 10,961,628 B1
(45) Date of Patent: Mar. 30, 2021

(54) DURABLE METAL OR METALLIC ALLOY BASED ICE RELEASE COATINGS

(71) Applicants: Anish Tuteja, Ann Arbor, MI (US);
Kevin Golovin, Kelowna (CA);
Michael Gurin, Glenview, IL (US)

(72) Inventors: Anish Tuteja, Ann Arbor, MI (US);
Kevin Golovin, Kelowna (CA);
Michael Gurin, Glenview, IL (US)

( * ) Notice: Subject to any disclaimer, the term of this patent is extended or adjusted under 35 U.S.C. 154(b) by 190 days.

(21) Appl. No.: 16/280,007

(22) Filed: Feb. 19, 2019

Related U.S. Application Data

(60) Provisional application No. 62/633,076, filed on Feb. 21, 2018.

(51) Int. Cl.
*C23C 30/00* (2006.01)
*C09D 5/00* (2006.01)
*C09D 175/04* (2006.01)
*C09D 183/04* (2006.01)

(52) U.S. Cl.
CPC .............. *C23C 30/005* (2013.01); *C09D 5/00* (2013.01); *C09D 175/04* (2013.01); *C09D 183/04* (2013.01)

(58) Field of Classification Search
None
See application file for complete search history.

*Primary Examiner* — Jeffrey D Washville

(57) ABSTRACT

Icephobic coatings that reduce ice adhesion strength must often achieve extreme durability requirements, such as in aviation or wind turbine applications, to survive the impact of high-speed rain (i.e., rain erosion testing). A multi-layer coating having a thin metallic or metallic alloy film adhered to an underlying layer that is softer and thicker than the metallic layer achieves very low ice adhesion with adhered ice onto the icephobic coating.

20 Claims, 3 Drawing Sheets

DURABLE METAL OR METALLIC ALLOY BASED ICE RELEASE COATINGS

FIELD

The present disclosure is directed towards a coating that reduces the adhesion of ice to an underlying substrate due to the presence of the coating. The coating is comprised of a thin, metallic or metallic alloy film adhered to an underlying layer that is softer and thicker than the metallic layer. The metallic film affords mechanical durability to the coating, and the flexibility of the underlying layer allows for easy release of accreted ice. The metal or alloy layer itself may additionally be coated with a thin layer of a protective coating for additional reasons, such as paints that provide color or reduce metal corrosion.

BACKGROUND

Ice accretion is an industrial problem in a wide variety of different sectors. Seafaring vessels in northern climbs must regularly shed accumulated ice. Wind turbine blades must be halted in winter months either to routinely remove ice, or until a higher temperature eliminates ice accretion. Aircraft wings must be de-iced in the cold, a costly and environmentally hazardous process. Thus, there is an urgent need for a coating that can resist the adhesion of ice while surviving the harsh conditions experienced during aircraft flight, turbine blade rotation, or a naval voyage. It will become apparent to those skilled in the art that the disclosed coatings afford exceptional mechanical durability, by means of a durable metallic or alloy surface, and exceptionally low ice adhesion strength, by means of a soft, flexible inner layer.

SUMMARY

A coating that reduces the ice adhesion to a substrate coated with said coating, comprising:
  a. A metal or metal alloy film, either bare or coated with a thin protective coating such as paint, that is in intimate contact with ice, having a thickness less than 250 µm;
  b. One or more underlying layers in intimate contact with the metallic film, having a Shore A hardness less than 70, and having a thickness greater than 100 µm. These layers may be composed of different polymers or foams as a non-limiting example.
  c. Wherein the coating comprising the metallic and underlying layers displays an ice adhesion strength less than 200 kPa. The adhesion strength of a solid can be measured as:
    i) the coating is adhered to a glass substrate
    ii) a plastic cuvette is placed on said coating such that water may fill the cuvette and freeze on the coated glass substrate
    iii) the water is frozen to −10° C. for at least 2 hours
    iv) a shear force is increasingly applied at the base of the adhered cuvette along the surface of the coating until the adhered ice is detached from the coated surface
    v) the ice adhesion strength is then calculated as the maximum force necessary to remove the adhered ice, divided by the area in contact; and
  d. Wherein the coating loses less than 20 mg of mass when subjected to abrasion according to the following evaluation;
    i) the mass of the coated sample is recorded
    ii) the sample is subjected to 100 cycles of linear TABER abrasion using the CS-10 abrasive tip, 1.1 kg of total load, a stroke length of 1 inch, and an abrasion rate of 60 cycles/minute
    iii) the mass of the abraded sample is recorded, removing any particulates from the abrasion process using compressed air or light wiping with a non-abrasive cloth or brush

DETAILED DESCRIPTION

By combining two disparate properties, a composite system often outperforms either constituent component for a desired application. In this disclosure the two main properties of interest are mechanical durability and ice adhesion. An ideal ice-release coating would exhibit minimal ice adhesion and extremely high mechanical durability. The force required to remove adhered ice from a surface has been shown theoretically to scale with the root of the shear modulus of the surface[1]. As such, high modulus and durable materials such as ceramics and metals typically exhibit high ice adhesion (>500 kPa). Conversely, low ice adhesion materials based on low shear modulus components are inherently mechanically poor. As will become apparent, the present disclosure presents a metallic coating that offers easy ice release without sacrificing mechanical durability.

Figure 1:
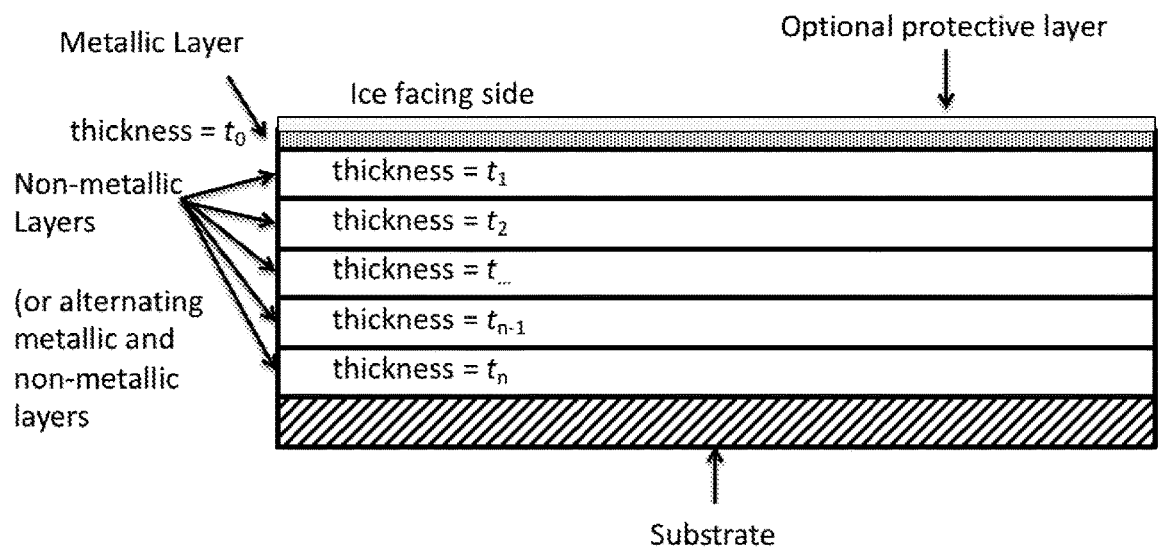
FIG. 1 is a cross-section view of the multi-layer icephobic composite.

The present disclosure relates to a coating with more than one layer, in which the bare or coated metal or metal alloy layer that contacts the ice is considered the "top," regardless of the actual orientation in space (FIG. 1). The substrate being coated is on the "bottom," and soft layers (one or more) exist in between the substrate and the metal that contacts the ice. We denote the metallic topcoat as Layer 0, and all other n-Layers increasing monotonically from 1 to n, where n is an integer. The thickness of the metal or metal alloy topcoat, t₀, is less than the total thickness of all other layers:

$$t_0 < \sum_{1}^{n} t_n$$

where the thickness of layer n is denoted $t_n$. In this disclosure, the metal or metal alloy topcoat provides the system with mechanical durability, and the bottom layers provide the system with mechanical compliance. During the application of a shear stress, normal forces can cause a buckling instability in a soft layer that is dependent on both the thickness and the modulus of the layer[2]. This buckling can lead to a loss of adhesion and is responsible for the low solid adhesion of soft materials. In order for the system described above to exhibit a similar response, the deformation in the soft layers must not be hindered by the rigidity of the topcoat. From beam theory[3], $$d = \frac{L^3 F}{4wt^3 E}$$

where d is the deflection of the beam, L is the length of the beam, F is the applied normal force, w is the width of the beam, t is the beam thickness, and E is the elastic modulus of the beam. For the present disclosure, the length, width, and applied force are all equal for each layer. This means that, in order for the deflection in each layer to be equal, $$\frac{E_0}{E_N} = \left(\frac{t_N}{t_0}\right)^3 \quad [1]$$

where we denote the modulus of the topcoat as $E_0$, and the overall modulus and thickness of all N layers with a subscript N. One can readily see that, if the elastic modulus of the metal or metal alloy layer is 1000 times greater than the modulus of the underlying layers, the metal topcoat must be 10 times thinner than these layers in order for the displacements to be equal. Note that criteria [1] is recursive for all N layers. In some embodiments we envision thin and higher modulus adhesive inter-layers that also meet criteria [1]. The metal or metal alloy topcoat should exhibit the highest modulus for any layer greater or equal in thickness. Moreover, embodiments where criteria [1] is not strictly met may still be effective, and therefore criteria [1] serves as a guideline rather than an exact threshold for usefulness. This will be demonstrated in the examples to follow.

In certain embodiments we contemplate additional layers that may have other uses beyond or in addition to easy ice release and high mechanical durability, and therefore do not limit the scope of the invention. These additional layers may have high modulus and high thickness, and therefore the mechanical effect described above terminates at these layers. However, the usefulness of the coating is still apparent in such cases, and therefore all of these additional layers need not meet criteria [1]. For example, in certain embodiments the entire N layers may be adhered to a thick plate that does not deflect with the other layers. This plate may then be adhered to another surface by an adhesive or otherwise, but this does not negate the usefulness of the original N-layer coating.

Another important embodiment is where the top metal or metal alloy layer is coated with another coating that provides a different function than easy release of ice. This could include paints that provide color or provide corrosion resistance to the metal or metal alloy. Thus, the composite system would provide easy release of ice, with or without the addition of the protective coating on the metal or metal alloy.

Ice Adhesion Test

Figure 2:
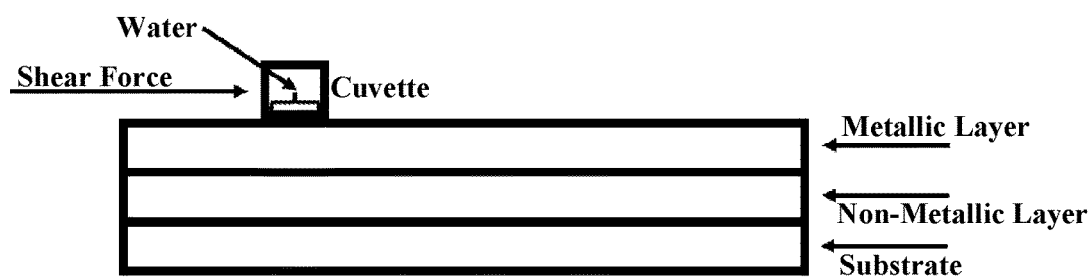
FIG. 2 is a top view of the ice adhesion strength test setup.
Figure 3:
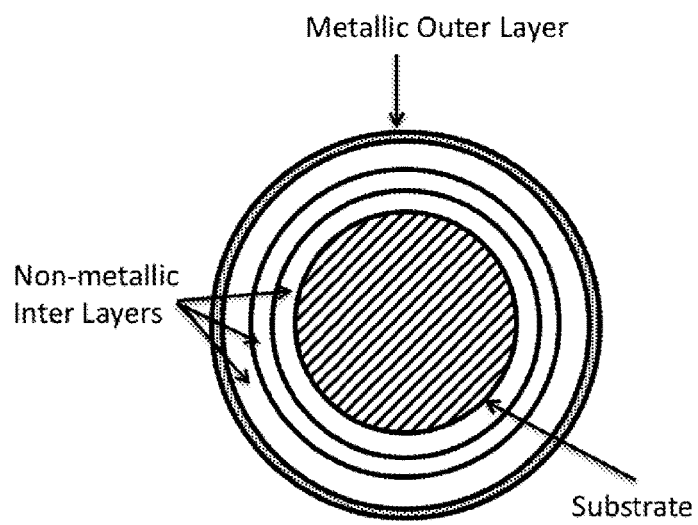
FIG. 3 is a cross-section view of the multi-layer icephobic composite in a cable implementation.

The ice adhesion is measured in the following way (FIG. 2):
  i) the coating comprising metal or metal alloy and underlying layers is adhered to a glass or metal substrate
  ii) a plastic cuvette is placed on said coating such that water may fill the cuvette and freeze on the coated glass substrate
  iii) the cuvette is filled with water and placed in a −10° C. environment and allowed sufficient time to fully freeze
  iv) a shear force is increasingly applied at the base of the adhered ice parallel to the surface of the coating until the adhered ice is detached from the coated substrate
  v) the ice adhesion strength is defined as the maximum force necessary to remove the adhered ice, divided by the area in contact with the ice The ice adhesion test described above was also performed on two different (other than ice) representative solids: ethylene vinyl acetate (EVA) and epoxy. EVA is a thermoplastic polymer glue typically used in hot glue guns, and serves as a representative molded polymer for mold release applications[4]. Epoxy is a thermosetting glue that is often used as a mimic for the adhesion of barnacles and other marine foulants[5]. These two solid adherents are representative and do not limit the scope of the coatings to other fouling solids.

Mechanical Durability Evaluation

Abrasion resistance is measured according to ASTM D4060[6] using a linear Taber Abrasion Instrument in the following manner:
  i. The mass of the coated substrate is recorded.
  ii. A CS-10 abrader tip is refaced using standard methods per the ASTM standard.
  iii. The tip is then brought in intimate contact with the coated substrate, and the abrader is moved back and forth over a 1-inch stroke length. A full 1-inch back and forth denotes one cycle of abrasion.
  iv. The sample is abraded for 100 cycles at a rate of 60 cycles per minute.
  v. The sample is removed, any residual abradant is light brushed off using compressed air or a soft cloth, and the sample is then massed again.
  vi. If the abrasion tears through the entire thickness of the coating before the 100 cycles has been reached, the number of cycles until breakthrough is noted.

The application method in which the layers are adhered to one another is unimportant. In certain embodiments the non-metallic layers exist as solid films, and they may be adhered to one another with an adhesive layer, either as a film, a liquid, a aerosolized spray, or by contact pressure. In certain embodiments the layers exist as liquids that are cast into solids, and these may be spin-coated, flow coated, drop coated, dip coated, spray coated, brushed, or printed. Combinations of liquid and solid layers are also contemplated, including several examples reduced to practice, described below.

TABLE 1

Example multi-layer coating formulations and their contact angle (static sessile droplet method), mass loss after abrasion (Taber abrasion, 100 cycles 1.1 kg load, CS-10 wheel-set), and their ice adhesion strength.

| Example | Bottom Layer ($t_N$ = 1/16") | Metal or Alloy Layer ($t_0$ = 0.001") | Contact angle | Mass Loss | Ice Adhesion (kPa) |
|---|---|---|---|---|---|
| | — | Steel | 47° | <1 mg | 689 ± 176 |
| | — | Stainless Steel | 57° | <1 mg | 377 ± 53 |
| | — | Aluminum | 13° | <1 mg | 489 ± 120 |
| | — | Brass | 10° | <1 mg | 876 ± 336 |
| | — | Copper | 57° | <1 mg | 764 ± 232 |
| | — | Nickel | 16° | <1 mg | 612 ± 82 |
| | BF-1000 | — | 121° | X | 68 ± 16 |
| | ECOFLEX 20 | — | 119° | X | 10 ± 2 |
| | PORON | — | 111° | X | 32 ± 4 |
| | ThinStik ($t_N$ = 1/32") | | | | |

TABLE 1-continued

Example multi-layer coating formulations and their contact angle (static sessile droplet method), mass loss after abrasion (Taber abrasion, 100 cycles 1.1 kg load, CS-10 wheel-set), and their ice adhesion strength.

| Example | Bottom Layer ($t_N = 1/16''$) | Metal or Alloy Layer ($t_O = 0.001''$) | Contact angle | Mass Loss | Ice Adhesion (kPa) |
|---|---|---|---|---|---|
| 1 | PORON ThinStik ($t_N = 1/32''$) | Stainless Steel | 54° | <1 mg | 53 ± 12 |
| 2 | BF-1000 | Steel | 45° | <1 mg | 87 ± 19 |
| 3 | BF-1000 | Stainless Steel | 55° | 1.7 mg | 86 ± 26 |
| 4 | BF-1000 | Aluminum | 22° | 3.1 mg | 77 ± 18 |
| 5 | BF-1000 | Brass | 21° | ~1 mg | 85 ± 15 |
| 6 | BF-1000 | Copper | 44° | 2.7 mg | 82 ± 18 |
| 7 | BF-1000 | Nickel | 20° | 3.2 mg | 91 ± 32 |
| 8 | ECOFLEX 20 | Steel | 43° | <1 mg | 56 ± 29 |
| 9 | ECOFLEX 20 | Stainless Steel | 52° | <1 mg | 58 ± 33 |
| 10 | ECOFLEX 20 | Aluminum | 13° | 1.1 mg | 42 ± 16 |
| 11 | ECOFLEX 20 | Brass | 11° | <1 mg | 44 ± 12 |
| 12 | ECOFLEX 20 | Copper | 52° | 1.4 mg | 46 ± 10 |
| 13 | ECOFLEX 20 | Nickel | 28° | 1.9 mg | 46 ± 11 |

An 'X' under mass loss denotes when the abrasion completed destroyed the coating before 100 abrasion cycles was reached. Such materials would not make a desirable coating.

BF 1000 is an open-cell silicone foam available from Rogers Inc., Walled Lake, Mich.

Ecoflex 20 is a 20 Shore 00 hardness silicone elastomer available from Smooth-On Inc., Macungie, Pa.

PORON ThinStik is a polyurethane foam available from Rogers Inc., Walled Lake, Mich.

All six metallic top layers were procured as shim stock available from McMaster Carr, Cleveland, Ohio Note that in many cases the top metal or metal alloy layer is hydrophilic with water contact angles <90°. In many cases, such as examples 9,10,11,12 and 13 shown in Table 1, the water contact angle on the layered composite structure is <60° and preferably <58°. This is because the top layer in the composite is either a metal or alloy layer, and most metals and metal alloys are hydrophilic. Yet, counter-intuitively, the coatings are icephobic, with ice adhesion strength <<100 kPa. Thus, surfaces like these are wet by liquid water and yet have low adhesion to solid water (ice).

The term metal or metal alloy "film" is used interchangeably with "foil" and/or "layer" hereinafter. A particularly preferred foil is made from a metal alloy having a grain size less than 100 nanometer "nm". The preferred grain size is less than 80 nm, specifically preferred grain size is less than 40 nm and particularly preferred grain size is less than 20 nm all while maintaining the ductility and elongation properties as close as possible (i.e., within 2% to 50%) of the original base metal or metal alloy (i.e., without nano-sized grains). Additional preferred properties of the metal alloy foil include maximum yield strength greater than 2000 MPa (and particularly preferred greater than 3000, specifically preferred greater than 6000 MPa). A hardness of the metal alloy foil of greater than 5 GPa, particularly preferred greater than 7 GPa, reduces the opportunity for erosion from rain, ice, bugs, dust, and sand all critical natural elements that adversely impact the lifetime and the ice adhesion strength of the inventive multi-layer low ice adhesion system.

Metals or metal alloys utilized in numerous applications are typically painted or coated to increase resistance to erosion and/or corrosion. The particularly preferred metal alloy foil does not require any additional outer paint or coating, thus avoiding the challenges of polymeric materials surviving rain or sand erosion conditions as typically required in aviation, transportation, or energy production industries (e.g., wind turbine). The preferred metal alloys are comprised of W, Ni, Cr, Co, Fe, Al, and Ti though it is understood that additional alloys are within the scope of the invention in so far as hardness and maximum yield strength are maintained without decreasing significantly the ductility or elongation of the alloy in comparison to the base metal itself. It is highly desirable to substantially decrease the thickness of the metal alloy film/foil while maintaining both corrosion and erosion resistance. The particularly preferred metal alloy film of a specific thickness "t" has ductility and elongation parameters of at least equivalent to an aluminum film/foil having a thickness of greater than at least 2t (and preferably greater than at least 4t).

It is understood that the metal alloy film/foil can also include metal matrix composites, including high ductility films having a graphene or graphene-like nanosheets on top of the substrate metal alloy film/foil.

It is an overall object that the effective composite modulus, which is a function of the thickness of each layer and its respective material shear modulus. One such mechanism to reduce the effective shear modulus is to increase the porosity of the material in the respective layer. The use of a metal foam, preferably that is contiguous with a metal foil. It is known in the art that a metal foil can have further growth on one surface through electroplating in a manner such that the further growth results in a porous surface. A significant advantage is realized when a metal foam is utilized as it eliminates any coefficient of thermal expansion mismatch between the otherwise distinct materials of the outer layer and the at least one second layer while also eliminating the requirement of an adhesive layer to bind the two distinct materials together. A preferable metal foam has inner-facing (i.e., opposite direction as the ice adhering side of the outer layer) slots interspersed within the porous foam portion so as to reduce the effective shear modulus. Metal foams [Jiang et al., *Scientific Reports* volume 5, Article number: 13825 (2015)] or other porous metal structures can be used either by themselves or as one of the at least one secondary layers. The design of the porous structure would be to ensure softness, i.e. have a Young's modulus <1000 MPa, preferably <500 MPa, and more preferably <300 MPa. As a reference point, Aluminum by itself has a Young's modulus of ~70 GPa (70,000 MPa) and Brass is ~102 GPa. A particularly preferred embodiment of the metal foam incorporates slits (also referred to as spacing void, or slots) that further reduce the effective shear modulus of the metal foam. It is understood that the slits can be a feature within the at least one second layer, regardless of the material in which the at least one second layer is made.

Regardless of the material used as the at least one second layer, it is a specific objective for the outer layer to be as thin as possible to maintain durability requirements (e.g., rain erosion conditions) and such that the deformation of the outer layer during operations of within the host device (e.g., airplane wing or fuselage, or wind turbine) does not cause adhesion loss between the outer layer and the at least one second layer.

Another application of this icephobic multi-layer composite is for ice making equipment or molds. The exemplary of the metal foam is particularly important as the foam portion of the multi-layer composite both increases by at least 20% the surface area exposure to a refrigerant, a secondary refrigerant (as known in the art e.g., ethylene glycol water mixture), or cold air and has substantially higher (by at least 20%, preferably at least 50%, and particularly preferred at least 300%) thermal conductivity as compared to a traditional polymeric foam (that typically acts as a thermal insulation layer).

It is a further object of the invention that the mechanism of action which makes this composite multi-layer coating icephobic is virtually identical to the inventive multi-layer coating being anti-hard fouling and bugphobic. It is highly desirable for the same coating to be both icephobic and bugphobic in aviation and wind-turbine applications.

EXAMPLES

Example 1

A 1/32" thick ThinStik sheet was adhered to stainless steel shim stock using double-sided tape (3M 9629PC).

Example 2-7

An adhesive-backed sheet of BF-1000 was procured. The 6 different metal shim stock pieces were adhered to the BF-1000 sheet using double sided tape (3M 9629PC).

Example 8-13

An approximately 1.5 mm thick layer of ECOFLEX 20 is prepared by mixing Part A and Part B of the ECOFLEX 20 system in equal proportions by weight. The mixture is homogenized by stirring by hand and poured onto the metal shim stock pieces. The silicone cures in 16 hours at room temperature. Once cured, system is flipped over such that the metal contacts the ice.

Figure 4:
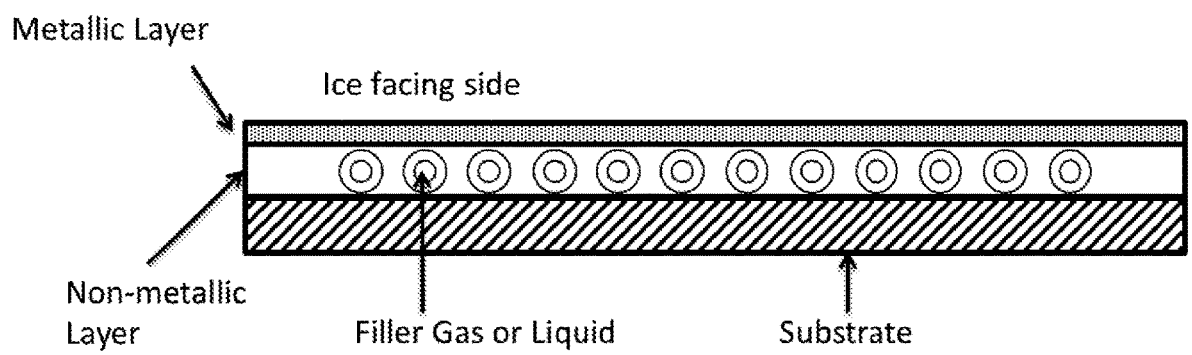
FIG. 4 is a cross-section view of the multi-layer icephobic composite with filler gas or liquid.

Turning to FIG. 4, FIG. 4 depicts the multi-layer composite such that second layer, preferably a foam, has filler gas or filler liquid within the foam component (i.e., non-metallic layer).

Figure 5:
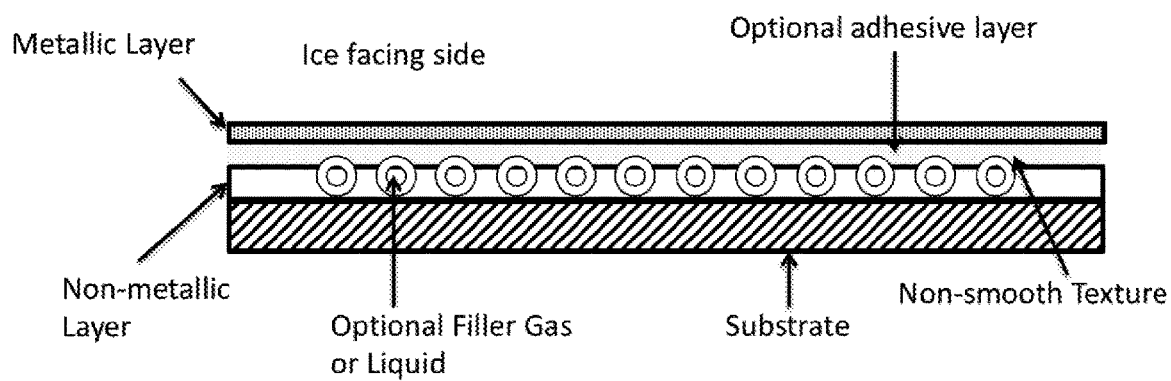
FIG. 5 is a cross-section view of the multi-layer icephobic composite with a non-smooth texture.

Turning to FIG. 5, FIG. 5 depicts the multi-layer composite such that second layer further incorporates the filler gas or filler liquid such that it creates an increased surface area (by creating a non-smooth texture) for superior adhesion of the outer layer and the second (i.e., foam) layer. The adhesive layer, which is optional though preferable, joins the outer layer and the second layer. It is understood that adhesive layer can be between any adjoining layer in the multi-layer composite system.

Figure 6:
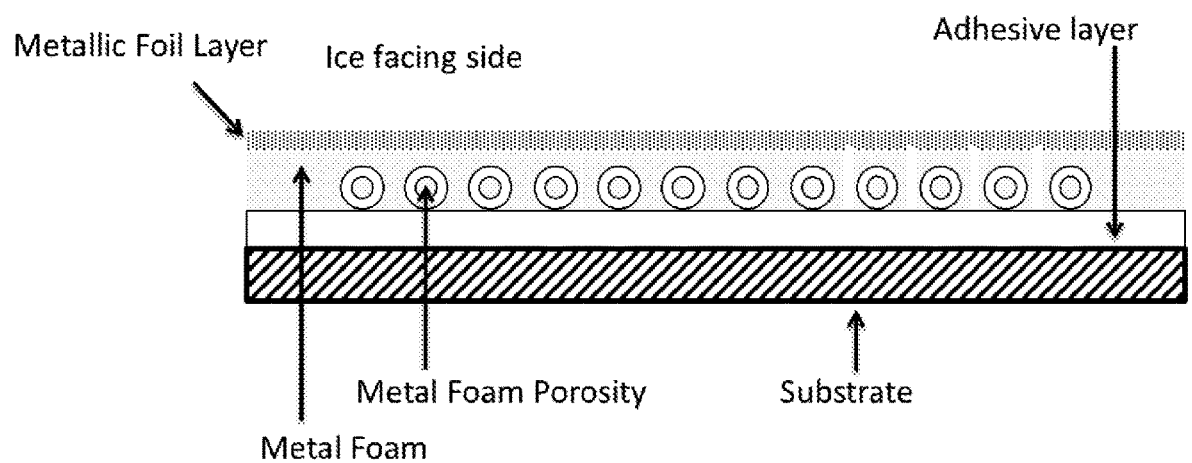
FIG. 6 is a cross-section view of the multi-layer icephobic composite using a metal foam.

Turning to FIG. 6, FIG. 6 is the embodiment where the foam as the second layer is replaced with a singular metal material such that the outer layer (i.e., metal foil) has a contiguous foaming section as the second layer with the metal foam having a porosity that is preferably maximized so as to minimize the effective modulus of first the high-porosity portion but also the overall multi-layer composite effective modulus.

REFERENCES

[1] K. Kendall, J. Phys. D: *Appl. Phys.* 1971, 4.
[2] M. K. Chaudhury, K. H. Kim, *Eur Phys JE Soft Matter* 2007, 23, 175.
[3] O. A. Bauchau, J. I. Craig, in *Structural Analysis*, (Eds: O. A. Bauchau, J. I. Craig), Springer Netherlands, Dordrecht 2009, 173.
[4] J. G. Drobny, in *Handbook of Thermoplastic Elastomers* (*Second Edition*), William Andrew Publishing, Oxford 2014, 33.
[5] M. Barnes, R. N. Gibson, R. N. Gibson, *Oceanography and Marine Biology: An Annual Review: Volume* 38: *An Annual Review*, Taylor & Francis, 2003.
[6] in *Standard Test Method for Abrasion Resistance of Organic Coatings by the Taber Abraser*, ASTM International, 2014.

We claim:

1. An icephobic coating that reduces the adhesion of an adhered ice to a substrate having a coating comprising multiple layers:
    wherein an outer layer is a metal or metal alloy film, either bare or further coated with a thin protective coating, whereby the outer layer is in intimate contact with the adhered ice, and whereby the metal or metal alloy has a thickness of less than 250 μm;
    wherein an at least one second layer is not in intimate contact with the adhered ice has a Shore A hardness less than 70, and has a thickness greater than the outer layer;
    wherein the icephobic coating comprising both the outer layer and the at least one second layer has an ice adhesion strength less than 200 kPa when measured using an ice adhesion evaluation method in accordance to: a) the icephobic coating comprising metallic and underlying layers is adhered to a glass or metal substrate, b) a plastic cuvette is placed on said coating such that water may fill the cuvette and freeze on the coated glass substrate, c) the cuvette is filled with water and placed in a −10° C. environment and allowed sufficient time to fully freeze, d) a shear force is increasingly applied at the base of the adhered ice parallel to the surface of the icephobic coating until the adhered ice is detached from the coated substrate, and e) the ice adhesion strength is defined as the maximum force necessary to remove the adhered ice, divided by the area in contact with the adhered ice; and
    wherein the coating loses a mass of less than 20 mg over the duration of the test when subjected to an abrasion method in accordance to: a) the mass of the coated sample is recorded, b) the sample is subjected to 100 cycles of linear TABER® abrasion using the CS-10 abrasive tip, 1.1 kg of total load, a stroke length of 1 inch, and an abrasion rate of 60 cycles/minute, c) the mass of the abraded sample is recorded, removing any particulates from the abrasion process using compressed air or light wiping with a non-abrasive cloth or brush.

2. The icephobic coating according to claim 1, whereby the outer layer or the at least one second layer is further comprised of an at least one additional layer.

3. The icephobic coating according to claim 1, whereby the metal or metal alloy film is an alloy of steel, stainless steel, brass, copper, titanium, gold, silver, bronze, aluminum, chromium, cobalt, zinc, platinum, or any combination thereof.

4. The icephobic coating according to claim 3 whereby the metal or metal alloy film is further comprised of an at least one non-metallic element added as a dopant to the metal or metal alloy.

5. The icephobic coating according to claim 1, whereby the at least one second layer is a non-metallic layer including a fluoropolymer; a polysiloxane; a polyurethane; a linear polymer; a copolymer; a thermosetting polymer; a thermoplastic polymer; a wood; a paper; a fabric; an organism; a sponge; a polymer gel; or a foam.

6. The icephobic coating according to claim 1, whereby the at least one second layer is a non-metallic layer further comprised of polyols, hardeners, plasticizers, foaming agents, gelling agents, solvents, fillers, or combinations thereof.

7. The icephobic coating according to claim 5 whereby the non-metallic layer is further comprised of a filler gas or a filler liquid, and the filler gas or filler liquid is encapsulated and physically held within the non-metallic layer.

8. The icephobic coating according to claim 1, whereby the outer layer and the at least one second layer is held together by an adhesive layer.

9. The icephobic coating according to claim 1, whereby the at least one second layer and the substrate is held together by an adhesive layer.

10. The icephobic coating according to claim 8 whereby the adhesive layer is an epoxy, polyurethane, cyanoacrylate, acrylic, ethylene vinyl acetate, aliphatic glue, polyvinyl acetate, collagen-based glue, gums, phenol formaldehyde, polyester, polyethylene, polypropylene, polysulfide, silicone, styrene acrylic copolymer, or any combination thereof.

11. The icephobic coating according to claim 9 whereby the adhesive layer is an epoxy, polyurethane, cyanoacrylate, acrylic, ethylene vinyl acetate, aliphatic glue, polyvinyl acetate, collagen-based glue, gums, phenol formaldehyde, polyester, polyethylene, polypropylene, polysulfide, silicone, styrene acrylic copolymer, or any combination thereof.

12. The icephobic coating according to claim 8 whereby the non-metallic layer contains a reactive species chemically that reacts with an adjacent layer.

13. The icephobic coating according to claim 8 whereby the at least one second layer is further comprised of a co-solvent to an adjacent layer and whereby the at least one second layer and the adjacent layer create a bond between the at least one second layer to the adjacent layer, and whereby the bond is created through interdigitation.

14. The icephobic coating according to claim 1, wherein the at least one second layer is comprised of a non-smooth texture having a roughness ratio r greater than 1.2 to increase the adhesion to an adjoining layer through an additional exposed surface area, and wherein the roughness ratio is an actual surface area divided by a projected surface area.

15. The icephobic coating according to claim 1, whereby the at least one second layer has a thermal conductivity >0.5 W/mK.

16. The icephobic coating according to claim 1, whereby at least one second layer has an electrical conductivity >$10^{-10}$ S/m.

17. The icephobic coating according to claim 1, whereby the outer layer envelops at least one second layer and whereby the at least one second layer has no exposure to the adhered ice.

18. The icephobic coating according to claim 1 whereby the outer layer has the thin protective coating comprising a polymer, metal, ceramic or semiconductor.

19. The icephobic coating according to claim 1, whereby the at least one second layer is comprised of an at least one set of an alternating non-metallic layer with a metallic layer, and whereby the non-metallic layer is closest to the outer layer.

20. The icephobic coating according to claim 1, whereby the at least one second layer is comprised of an at least one set of an alternating non-metallic layer with a metallic layer, whereby the non-metallic layer is closest to the outer layer, and whereby an adhesive layer is between each of the alternating non-metallic layer and metallic layer.

* * * * *